United States Patent Office

3,415,634
Patented Dec. 10, 1968

3,415,634
TREATMENT OF HYDROCARBON
CONTAINING OILS
Frederick James Dent and George Percival, Solihull, England, assignors to The Gas Council, London, England, a British body corporate
No Drawing. Filed July 31, 1963, Ser. No. 299,064
Claims priority, application Great Britain, Aug. 3, 1962, 30,016/62
10 Claims. (Cl. 48—213)

ABSTRACT OF THE DISCLOSURE

A process is disclosed for continuously reforming hydrocarbons by passing the vapor of a hydrocarbon feedstock along with a mixture of steam and a hydrogenating gas over an active steam reforming metal catalyst. Without regenerating the catalyst the hydrocarbon feedstock vapor is converted in a single stage into a gas containing no hydrocarbon above methane. The hydrogenating gas may be molecular hydrogen alone or in combination with carbon monoxide, carbon dioxide and gaseous hydrocarbons.

---

The invention relates to the treatment of hydrocarbon-containing oils.

According to the present invention there is provided a process for the manufacture of a methane-containing gas which process comprises bringing a heated mixture of a hydrocarbon feedstock with hydrogen and steam into contact with a highly active metal catalyst under such conditions that the mixture reacts to produce substantially only products which are gaseous at standard temperature and pressure.

In this specification the term "hydrocarbon feedstock" means a single hydrocarbon or a mixture which is gaseous at ordinary temperatures and pressures or boils below 300° C. at atmospheric pressure, which can be brought to an adequate state of purity and which consists wholly or mainly of hydrocarbons, for example, propane or butane, liquid paraffinic hydrocarbons, or cyclic hydrocarbons such as cyclo-paraffins or benzene. The feedstock may be a petroleum distillate with a specific gravity of less than 0.72 at 20° C.

The hydrogen used in processing according to this invention may be in the form of a hydrogenating gas.

The hydrogenating gas must contain hydrogen, preferably more than 50 percent of hydrogen, but this can be admixed with carbon monoxide, carbon dioxide and gaseous hydrocarbons. When carbon monoxide and/or carbon dioxide are present, these constituents can react with hydrogen over the catalyst to produce methane, an exothermic reaction which liberates more heat for the interaction of more of the hydrocarbon feedstock with steam. Still more heat for the reaction of the hydrocarbon feedstock with steam can be liberated by the introduction of air to the reaction vessel or by heating the vessel externally. Normally, the concentration of gaseous hydrocarbons in the hydrogenating gas will be less than in the gas that is required to produce.

The proportions of steam and hydrogenating gas can vary widely according to the composition desired in the final gas. Broadly, as the proportion of hydrogenating gas is increased, at a given pressure, the catalyst assumes a higher temperature and the calorific value of the gas produced is lower, since, at the higher temperature, in accordance with known equilibria, it will then contain a lower concentration of hydrogen gases. Conversely, as more steam is used, the reaction temperature will be lower, and the calorific value of the gas produced will increase. Per lb. atom of carbon in the feedstock, the supply of hydrogen as hydrogenating gas will preferably be from 0.1 to 2.5 lb. mols and the supply of steam from 2.5 to 0.3 lb. mols.

The catalyst is preferably nickel, promoted with a refractory oxide, for example, alumina, chromia or titania. The catalyst may also contain compounds of the alkali or alkaline earth metals, which are known promoters for both the hydrogenation of hydrocarbons and the interaction of hydrocarbons with steam.

The catalyst needs to be more active than those generally used for reforming hydrocarbons. As a rough guide it may be said that a catalyst is sufficiently active at a temperature T ° C. for the purpose of the invention if it will, within a reasonable time, bring the following reaction to equilibrium at that temperature T:

$$CO + 3H_2 \rightleftharpoons CH_4 + H_2O$$

If a $Ni/Al_2O_3$ catalyst is used, activity will depend largely on two factors, namely, nickel concentration, and the method of formation, for example, co-precipitation rather than adsorption.

It is preferred that the catalyst is present in the form of a fluidised bed and maintained in this condition by the passage of reactants through the bed. This is particularly true when the hydrogenating gas is used directly from a reformer at 750° to 800° C., when the hydrogenating gas contains more than 15% by volume of carbon oxides, or when air is added to the mixture. In this case it is preferred that the supply of hydrogen as hydrogenating gas is between 0.1 and 2.5 mols per lb. atom of carbon in feedstock, the supply of steam is between 2.5 and 0.3 mols per lb. atom of carbon in feedstock, and the supply of air is below 0.5 lb. mol per lb. atom of carbon. Alternatively the catalyst may be, for example, in pellet form in the normal type of fixed bed, when it is preferred that the supply of hydrogen as hydrogenating gas is between 0.1 and 2.5 lb. mols per lb. atom of carbon is feedstock, the supply of steam is between 2.5 and 0.3 lb. mols per lb. atom of carbon in feedstock, and there is no air supplied.

The highly active catalysts tend to be poisoned by sulphur compounds and it may therefore be necessary to remove sulphur from the hydrocarbon feedstock before reaction, or indeed from the other reactants also. It is preferred that the sulphur content of the hydrocarbon feedstock is not more than 2 parts per million. This means that the sulphur content of the mixture used in the invention should generally not be more than 0.01 grain per 100 cubic feet and preferably not more than 0.001 grain per 100 cubic feet. The removal of sulphur may be effected by any known process, for example by reduction of the sulphur by a reducing gas to hydrogen sulphide over a cobalt/molybdenum or nickel-molybdenum catalyst, followed by absorption of the hydrogen sulphide on "Luxmasse" (registered trade mark) which is an iron oxide containing material obtained as a by-product in the manufacture of aluminium.

It is preferred that the reducing gas used in the reduction step of the process of removing sulphur is formed by reacting the gaseous product of the present invention with steam so as to form hydrogen and carbon oxides, with possible addition of more hydrogen. However, if "Luxmasse" is used in the process for the removal of sulphur, the reducing gas should preferably contain not more than 5% by volume of carbon oxides.

The reaction conditions in the hydrogenation process of the invention may vary over a wide range. Reaction is very slow at temperatures below 375° C. The preferred temperature range is 450° C. to 900° C.; temperatures of from 600° C. to 700° C. are more preferred.

The pressure may be varied from 3 to 50 atmospheres. The optimum temperature rises with pressure.

At these temperatures the reaction of hydrocarbons with steam is endothermic. The hydrogen which is introduced into the reaction mixture may be regarded as a means for maintaining the reaction temperature, as the reactions of hydrogen with both hydrocarbons and carbon monoxide are exothermic.

Following is a description by way of example of a process in accordance with the invention:

EXAMPLE 1

A light petroleum distillate having a specific gravity of 0.65 at 20° C. and a boiling range of 40° to 80° C. and containing 200 p.p.m. of sulphur was evaporated and mixed with a hydrogen-containing gas such that the mixture contained 10% by volume of hydrogen.

The mixture, containing 10% by volume of hydrogen and less than 0.5% by volume of carbon oxides, was passed at a pressure of 20 atmospheres and a temperature of 375° C. over a nickel/molybdenum catalyst at a space velocity of about 500 volumes per volume per hour for the gas at standard temperature and pressure.

The resulting mixture was passed directly at the working temperature of from 300 to 350° C. through a bed of Luxmasse at a similar space velocity to that used over the nickel/molybdenum catalyst. The resulting petroleum distillate was found to have a sulphur content of less than 0.2 part per million.

The desulphurated pertoleum distillate was evaportaed and mixed with steam in the proportion of 0.83 lb. mol of steam per 1 lb. atom of carbon. The mixture was passed upwardly under a pressure of 350 lbs. per sq. inch gauge through a 12 in. fluidised bed of the nickel catalyst together with hydrogen gas and air in the proportion of 1.03 lb. mols of hydrogen and 0.42 lb. mol of air per lb. atom of carbon. By preheating the reactants to 450° C. the temperature of the catalyst bed was maintained at 675° C. and radiant heat loss from the bed was prevented by an electric furnace surrounding the reaction tube.

With the chosen linear velocity of 0.1 ft./sec. the catalyst bed was maintained in the fluidised condition by the passage of the reactants through it. At the conclusion of the experiment, which lasted 7 hours, the catalyst was poured from the reaction tube and analysed to determine the proportion of carbon present. No significant amount was found.

The composition of gas produced during the experiment is given below; the figures are percent by volume.

|  | Leaving catalyst | Dried |
|---|---|---|
| $CO_2$ | 5.70 | 8.25 |
| $CO$ | 2.50 | 3.60 |
| $H_2$ | 23.90 | 34.65 |
| $CH_4$ | 25.20 | 36.50 |
| $N_2$ | 11.70 | 17.00 |
| $H_2O$ | 31.00 |  |

Throughout the experiment the movement of the catalyst particles maintained an even temperature distribution within the bed, there being a variation of less than 5° C.

The catalyst was prepared by the following method. To a solution of aluminium and nickel nitrates at its boiling point was added a boiling solution of an alkali metal carbonate. The precipitate was filtered and repeatedly slurried with wash water until the pH of the effluent was from 7 to 8. The precipitate was dried at 110° C. in air, calcined at 500° C. and ground until the particles had a British Standard Mesh number in the range 72 to 200 (210 to 75 microns). The nickel compounds were reduced by reaction with sulphur-free hydrogen-containing gas at 450° C. The resulting catalyst had a composition of 28% by weight of nickel and 72% by weight of alumina.

EXAMPLE 2

Desulphurated petroleum distillate having a specific gravity of 0.71 and a final boiling point of 165° C. was evaporated and mixed with steam in the proportion of 1.56 lbs. mols of steam per 1 lb. atom of carbon. The mixture was passed downwardly under a pressure of 135 lb. per square inch gauge through a fixed bed of the nickel catalyst, 12 in. deep, together with hydrogen gas and carbon dioxide gas in the proportion of 1.2 lb. mols of hydrogen and 0.063 lb. mols of carbon dioxide per lb. atom of carbon. By preheating the reactants to 450° C., the temperature of the catalyst was maintained at 570° C. the reaction being exothermic. Heat loss from the catalyst bed was prevented by an electric furnace surrounding the reaction tube.

The experiment continued for 1500 hours during which time no change in the composition of the product gas was observed.

The catalyst was prepared in a manner similar to that described in Example 1 except that the size of particle used was within the range 18 to 30 B.S.S. (500 to 850 microns) and had a composition of 73.8% by weight of nickel, 24.6% by weight of alumina and 1.6% by weight of potassium.

The composition of the gas produced during the experiment is given below; the figures are percent by volume:

|  | Leaving catalyst | Dry |
|---|---|---|
| $CO_2$ | 4.9 | 8.35 |
| $CO$ | 1.1 | 1.85 |
| $H_2$ | 26.2 | 45.35 |
| $CH_4$ | 25.6 | 44.20 |
| $N_2$ | 0.1 | 0.25 |
| $H_2O$ | 42.1 |  |

Calorific value, B.t.u./cu. ft. 590 B.t.u. per cu. ft.

It is known that, when hydrocarbon feedstocks are reacted with steam alone, at temperatures below about 550° C. there is a tendency for the catalyst to lose activity by the formation of polymerised materials on its surface and that such tendency can be counteracted by the supply of steam in excess of that required by the equilibria concerned. It has now been found that the presence of hydrogen in the present example reduces the tendency for the formation of polymerised materials and that, in any given circumstances of temperature pressure and hydrogen supply, the supply of steam can be reduced to the minimum required by equilibrium. At temperatures above 550° C. the tendency is for the feedstock to decompose with the deposition of carbon, a tendency which can also be counteracted by the supply of excess steam. Hydrogen often similarly reduces the tendency for the deposition of carbon and allows the steam supply to be minimised. The calorific value of the gas produced may be varied from 300 to 650 B.t.u. per cu. ft. or to 850 B.t.u. per cu. ft. if carbon dioxide is removed from it. Accordingly the invention also includes gas when manufactured by the process hereinbefore described.

We claim:
1. A vapor-phase process for continuously reforming hydrocarbons which process comprises passing the vapor of a hydrocarbon feedstock having a maximum of two parts per million of sulphur and a boiling point at atmospheric pressure between room temperature and 300° C. with a mixture comprising steam and hydrgenating gas over an active steam reforming metal catalyst maintained, without regeneration, at a temperature between 450° C. and 900° C. whereby said vapor of the hydrocarbon feedstock is converted in a single stage into a gas containing no hydrocarbon above methane, said hydrogenating gas being selected from the group consisting of molecular hydrogen and mixtures of molecular hydrogen with carbon monoxide, carbon dioxide and gaseous hydrocarbons, the concentration of hydrogenating gas in said mixture being equivalent to between 0.1 and 2.5 pound moles of hydrogen and the concentration of said steam in said mixture being at least 0.3 pound moles per pound atom of carbon in the feedstock.

2. A process as claimed in claim 1, in which the reaction is carried out at a pressure between 3 and 50 atmospheres.

3. A process as claimed in claim 1, in which the temperature of the catalyst is between 600° C. and 700° C.

4. A process as claimed in claim 1, in which the hydrocarbon feedstock is a petroleum distillate with a specific gravity of less than 0.72 at 20° C.

5. A process as claimed in claim 1, in which the sulphur content of said hydrocarbon feedstock is not more than 0.2 parts/million by weight.

6. A process as claimed in claim 1, in which said mixture further comprises air in a concentration up to 0.5 mole per atom of carbon in the feedstock.

7. A process as claimed in claim 1 in which the catalyst is present in the form of a fluidized bed and maintained in this condition by the passage of the reactants through the bed.

8. A process as claimed in claim 1, in which the catalyst is present in the form of a fixed bed of particles.

9. A process as claimed in claim 1, wherein said active steam reforming metal catalyst is capable of bringing to equilibrium the reaction $CO+3H_2 \rightleftharpoons CH_4+H_2O$ at the operating temperature.

10. A process as claimed in claim 1, wherein said active steam reforming metal catalyst is nickel promoted with a refractory oxide taken from the group consisting of alumina, chromia and titania.

References Cited

UNITED STATES PATENTS

| 2,711,419 | 6/1955 | Milbourne et al. | 48—214 X |
|---|---|---|---|
| 2,941,877 | 6/1960 | Grahame | 48—215 X |
| 2,976,134 | 3/1961 | Paull | 48—214 X |
| 3,119,667 | 1/1964 | McMahon. | |

OTHER REFERENCES

Bennett: Concise Chemical and Technical Dictionary, pp. 456 and 556 (and frontpage), 1947, Chemical Publ. Co., Inc., New York.

JOSEPH SCOVRONEK, *Primary Examiner.*

U.S. Cl. X.R.

48—197, 214, 215; 208—108